US007514506B2

(12) United States Patent
Mansfield et al.

(10) Patent No.: US 7,514,506 B2
(45) Date of Patent: Apr. 7, 2009

(54) FAST CURING FLUOROELASTOMERIC COMPOSITIONS, ADHESIVE FLUOROELASTOMERIC COMPOSITIONS AND METHODS FOR BONDING FLUOROELASTOMERIC COMPOSITIONS

(75) Inventors: Corinne A. Mansfield, Lansdale, PA (US); James W. Hughes, Lansdale, PA (US); Eugene Gurevich, Bensalem, PA (US); Brian Ux, Pennsburg, PA (US); Carmin Quartapella, Schwenksville, PA (US)

(73) Assignee: Greene, Tweed of Delaware, Inc., Wilmington, DE (US)

( * ) Notice: Subject to any disclaimer, the term of this patent is extended or adjusted under 35 U.S.C. 154(b) by 0 days.

(21) Appl. No.: 11/091,031

(22) Filed: Mar. 28, 2005

(65) Prior Publication Data
US 2006/0287438 A1 Dec. 21, 2006

Related U.S. Application Data

(60) Provisional application No. 60/558,020, filed on Mar. 31, 2004.

(51) Int. Cl.
*C08F 8/32* (2006.01)
(52) U.S. Cl. .................. 525/374; 525/326.3; 525/380; 525/382; 525/387
(58) Field of Classification Search .............. 525/326.3, 525/374, 380, 382, 387
See application file for complete search history.

(56) References Cited

U.S. PATENT DOCUMENTS

| | | | |
|---|---|---|---|
| 2,676,985 A | 4/1954 | Husted | |
| 3,317,484 A | 5/1967 | Fritz et al. | |
| 3,347,901 A | 10/1967 | Fritz et al. | |
| 3,669,941 A | 6/1972 | Dorfman et al. | |
| 3,845,051 A | 10/1974 | Zollinger | |
| 4,138,426 A | 2/1979 | England | |
| 4,141,874 A | 2/1979 | Oka et al. | |
| 4,242,498 A | 12/1980 | Rosser et al. | |
| 4,281,092 A | 7/1981 | Breazeale | |
| 4,394,489 A | 7/1983 | Aufdermarsh | |
| 4,413,094 A | 11/1983 | Aufdermarsh | |
| 4,434,106 A | 2/1984 | Rosser et al. | |
| 4,487,903 A | 12/1984 | Tatemoto et al. | |
| 4,496,682 A | 1/1985 | Schmiegel | |
| 4,525,539 A | 6/1985 | Feiring | |
| 4,922,019 A | 5/1990 | Lau et al. | |
| 4,983,680 A | 1/1991 | Ojakaar | |
| 4,983,697 A | 1/1991 | Logothetis | |
| 5,001,278 A | 3/1991 | Oka et al. | |
| 5,028,728 A | 7/1991 | Schneider et al. | |
| 5,266,650 A | 11/1993 | Guerra et al. | |
| 5,319,025 A | 6/1994 | Weigelt | |
| 5,447,993 A | 9/1995 | Logothetis | |
| 5,565,512 A | 10/1996 | Saito et al. | |
| 5,623,145 A | 4/1997 | Nuss | |
| 5,637,648 A | 6/1997 | Saito et al. | |
| 5,668,221 A | 9/1997 | Saito et al. | |
| 5,672,758 A | 9/1997 | Sonoi et al. | |
| 5,677,389 A | 10/1997 | Logothetis et al. | |
| 5,688,872 A | 11/1997 | Sonoi et al. | |
| 5,696,189 A | 12/1997 | Legare | |
| 5,700,879 A | 12/1997 | Yamamoto et al. | |
| 5,767,204 A | 6/1998 | Iwa et al. | |
| 5,789,489 A | 8/1998 | Coughlin et al. | |
| 5,789,509 A | 8/1998 | Schmiegel | |
| 5,877,264 A | 3/1999 | Logothetis et al. | |
| 5,891,941 A | 4/1999 | Tanaka et al. | |
| 6,114,452 A * | 9/2000 | Schmiegel | ............... 525/194 |
| 6,211,319 B1 | 4/2001 | Schmiegel et al. | |
| 6,221,971 B1 * | 4/2001 | Tabb | .................. 525/326.3 |
| 6,281,296 B1 | 8/2001 | MacLachlan et al. | |
| 6,429,271 B1 | 8/2002 | Schmiegel | |
| 6,638,999 B2 | 10/2003 | Bish et al. | |
| 6,657,013 B2 | 12/2003 | Grootaert et al. | |
| 6,730,760 B2 | 5/2004 | Grootaert et al. | |
| 6,737,479 B2 | 5/2004 | Faulkner | |

(Continued)

FOREIGN PATENT DOCUMENTS

EP   0 708 140 A1   4/1996

(Continued)

OTHER PUBLICATIONS

Arcella, et al., "New Peroxide Curable Perflouorelastomer for High Temperature Application", Abstract No. 16, Rubber Chemistry and Technology, ACS Rubber Division (1998).

(Continued)

*Primary Examiner*—Bernard Lipman
(74) *Attorney, Agent, or Firm*—Flaster/Greenberg P.C.

(57) ABSTRACT

Compositions including at least one curable fluoropolymer are disclosed which include at least one functional group for crosslinking the fluoropolymer, a curative capable of crosslinking the at least one fluoropolymer selected from the group consisting of functionalized biphenyl-based compounds, various monoamidine and monoamidoxime compounds as well as bisamidine compounds and combinations thereof; and at least one cure accelerator which may be an organic peroxide or an organic peroxide in combination with a colorant. Adhesive fluoroelastomeric compositions comprising colorants are also provided. The compositions described provide beneficial physical properties, increased plasma resistance, unique adhesive properties and/or reduced contamination associated with use of external adhesives. Methods for forming articles which incorporate fluoroelastomers bonded to metallic surfaces are also provided.

20 Claims, 1 Drawing Sheet

U.S. PATENT DOCUMENTS

| | | | |
|---|---|---|---|
| 6,750,304 | B2 | 6/2004 | Kaspar et al. |
| 6,846,880 | B2 | 1/2005 | Grootaert et al. |
| 6,921,796 | B2 * | 7/2005 | Hetherington ........... 525/326.3 |
| 2002/0026014 | A1 | 2/2002 | Bish et al. |
| 2002/0183458 | A1 | 12/2002 | Grootaert et al. |
| 2004/0024133 | A1 | 2/2004 | Hetherington |
| 2004/0024134 | A1 | 2/2004 | Grootaert et al. |
| 2004/0044139 | A1 | 3/2004 | Grootaert et al. |
| 2004/0048983 | A1 | 3/2004 | Hochgesang et al. |
| 2005/0143529 | A1 | 6/2005 | Grootaert et al. |

FOREIGN PATENT DOCUMENTS

| | | |
|---|---|---|
| EP | 0 708 140 B1 | 8/1998 |
| RU | 606867 | 5/1978 |
| WO | WO 00/08076 | 2/2000 |
| WO | WO 00/09603 A1 | 2/2000 |
| WO | WO 02/060969 A1 | 8/2002 |

OTHER PUBLICATIONS

Brown, Abstracts of the 128th National Meeting of the American Chemical Society, Minneapolis, MN (Sep. 1955) (Abstract No. 90).

Brown et al., Reactions of the Perfluoroalkylnitriles. IV. Preparation and Characterization of Some N'-(Perfluoroacylimidoyl) perfluoroakylamidines and Their Metal Chelates, J. Org. Chem., vol. 28pp. 1122-1127(1963).

Brown et al. Thermally Stable Polymers from Condensation Polymerization of Perfluoroalkylamidines, J. Polymer Sci., vol. 44, pp. 9-22(1960).

Dorfman et al., "A Synthesis of Poly(2,4-Perfluoroalkylene-6-Perfluoroalkyltriazine)s", 89th National Meeting of the Division of Rubber Chemistry of the American Chemical Society, San Fransisco, CA (Spring 1966).

Evers, "Low Glass Transition Temperature Fluorocarbon Ether Bibenzoxazole Polymers, " J. Poly. Sci., vol. 16, pp. 2833-2848 (1978).

Grindahl et al., The Preparation and Coupling of Some a-Haloperfluoromethyl-s-triaines, J. Org. Chem., 32,pp.603-607 (1967).

Hertz, Jr., "11. Temperature Resistant Elastomers-D. Fluoroelastomers," Basic Elastomer Technology, ACS Rubber Division (2001).

Korus, "High Performance Perfluoroalkyl Ether Triazine Elastomers", Ind. Eng. Chem Prod. Res. Dev.20(4),pp.694-696 (1981).

Reilly et al., "Reactions of Perfluoronitririles. I. Synthesis of Dervatives of Perfluoroamidines, N-Substituted Perfluoroamidines and Perfluorothioamides," J. A-- 1956.

Smith, The Chemistry of Open-Chain Organic Nitrogen Compounds, vol. 1, pp. 178-179 (1965).

Smoot Abstracts of the 128th National Meeting of the American Chemical Society, Minneapolis, MN (Sep. 1955) (Abstract No. 7).

Brown et al. the 134th National Meeting of the ACS, Chicago, ILL. (Sep. 1958) (Abstract No. 45).

Reily et al., J. Org. Chem., vol 22, pp698 (1957).

Brown the 147th National Meeting of the ACS, Philadelphia, PA (5 pages)(Apr. 1964) (Abstract No. 32).

* cited by examiner

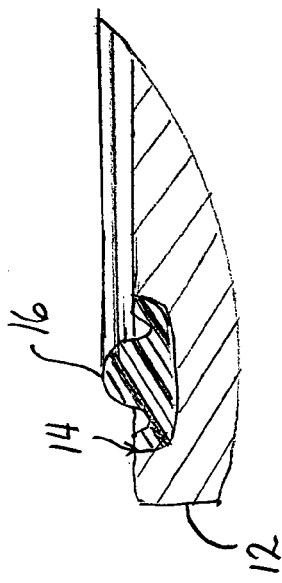
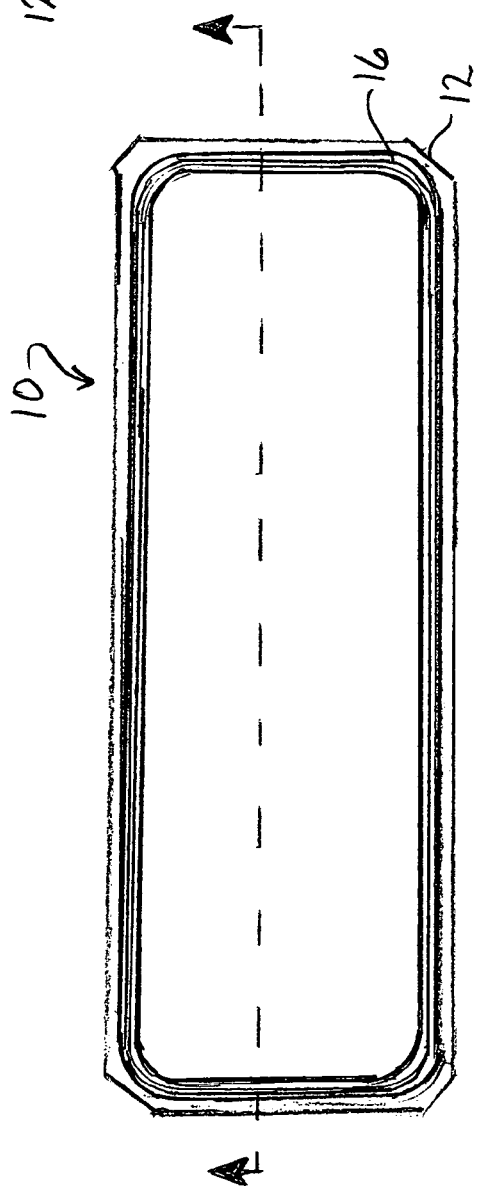

FAST CURING FLUOROELASTOMERIC COMPOSITIONS, ADHESIVE FLUOROELASTOMERIC COMPOSITIONS AND METHODS FOR BONDING FLUOROELASTOMERIC COMPOSITIONS

CROSS-REFERENCE TO RELATED APPLICATIONS

This application claims the benefit of priority under 35 U.S.C. § 119(e) based upon U.S. Provisional Patent Application No. 60/558,020, filed Mar. 31, 2004, the entire disclosure of which is incorporated herein by reference.

BACKGROUND OF THE INVENTION

Fluoroelastomers, and more particularly, perfluoroelastomers are materials known for their high levels of chemical resistance, plasma resistance, acceptable compression set resistance and satisfactory mechanical properties. Fluoroelastomers have thus found use as seals, gaskets and linings. When high temperature or aggressive or harsh environments, such as corrosive fluids, solvents, lubricants, and oxidizing or reducing conditions are implicated, perfluoroelastomers are the materials of choice. Fluoroelastomers are made by various routes using fluorinated monomers. Perfluoroelastomers are typically formed by using perfluorinated monomers, including a perfluorinated curesite monomer, polymerizing the monomers and curing (cross-linking) the composition using a curing agent which reacts with the incorporated curesite monomer to form a material which exhibits elastomeric properties. Suitable curesite monomers include, among others, those having cyano curesites. Examples of primary and secondary cyano-containing curesite monomers are known in the art. It is believed that in curesite monomers having cyano curesites, certain curing agents trimerize the cyano cure sites which join to form triazines.

Known curing agents include organometallic compounds and the hydroxides thereof, especially organotin compounds, including allyl-, propargyl-, triphenyl- and allenyl tin and the hydroxides. The tetraalkyltin compounds or tetraaryltin compounds, for example tetraphenyltin, are common. However, these curing agents provide a relatively slow rate of cure, are toxic and can introduce metallic contaminants to resulting elastomers.

Organic peroxides, e.g., dialkyl peroxides, are also known primary curing agents used with co-agents such as triallylisocyanurates for curing perfluoropolymers incorporating $CH_2X$ and similar functional groups for crosslinking. Organic peroxide cures are typically faster than those noted above, and can provide better chemical resistance properties and good processability, but are relatively thermally unstable. Such peroxide and co-agent curing systems are known and are exemplified in U.S. Pat. No. 4,983,680. Similarly, the use of such curing systems in conjunction with a second, different curing system, so-called dual cure systems are also known, for example, U.S. Pat. No. 5,447,993 and WO 02/060969 A1.

Curing agents containing amino groups have also been employed. These include diamines and diamine carbamates, such as N,N'-dicinnamylidene-1,6-hexanediamine, trimethylenediamine, cinnamylidene trimethylenediamine, cinnamylidene ethylenediamine, and cinnamylidene hexamethylenediamine, hexamethylenediamine carbamate, bis(4-aminocyclohexyl)methane carbamate, 1,3-diaminopropane monocarbamate, ethylenediamine carbamate and trimethylenediamine carbamate.

Bisaminophenols, bisaminothiophenols and bisamidrazones are also known curing agents for use with various fluoro and perfluoroelastomers. Those having a diphenyl structure having substitutions on each phenyl ring of amino and hydroxyl, diamine, and amino and thio are generally in the art as being connected by structures including: $-SO_2-$, $-O-$, $-CO-$, alkyl groups of 1-6 carbon atoms, and a carbon-carbon double bond. While perfluoroalkyl groups of 1-10 carbon atoms have been loosely described, actual synthesis and use of such compounds as curatives have not been demonstrated. Those which are in use and have known syntheses, are primarily compounds of this variety which have three carbon alkyl groups in and in which the phenyl groups are attached to the central (second) carbon in the bis-position. For example, the most well known curative of this type is 2,2-bis [3-amino-4-hydroxyphenyl] hexafluoropropane, also known as diaminobisphenol AF or BOAP. BOAP is a crystalline solid with a melting point of about 245-248° C. BOAP is not very compatible with perfluoroelastomers, is difficult to disperse rapidly and uniformly with perfluoroelastomers, and is thus a relatively slow-acting curative. Thus, there is a need in the art to accelerate the cure in most cases for desirable curing times and processing. An example of the use of BOAP as a curative may be found in U.S. Pat. No. 6,114,452.

With respect to ways to accelerate slow curing agents, such as BOAP, there are traditional accelerators used in the art including organic or inorganic ammonium salts, e.g. perfluorooctanoate, ammonium perfluoroacetate, ammonium thiocyanate, and ammonium sulfamate; urea; t-butyl carbamate; acetaldehyde ammonia; tetraalkylphosphonium salts, tetraalkylammonium salts, and trialkylsulfonium salts, such as benzyltriphenylphosphonium chloride, benzyltriphenylphosphonium bromide, benzyltriphenylphosphonium phenolate of bisphenol AF, tetrabutylammonium hydrogen sulfate, and tetrabutylammonium bromide. However, such compounds tend to have side reactions that can result in undesirable byproducts.

While all of these curing systems exist, with the goals of providing improved processing, good physical properties, minimized impurities, good rheology and in some cases faster cures, improvements are still desired, particularly in curing rates and in meeting the ever-increasing demand for reduction in impurities both with respect to particle type, polymer erosion or etching, and particle size. Most current perfluoroelastomeric compositions exhibit processing difficulties and incur part rejection, resulting in high costs and long lead times. There is also the desire to increase the strength of such compositions.

Accordingly, there remains a need in the art for an improved curing agent capable of more easily dispersing in and more quickly curing fluoroelastomers and perfluoroelastomers, particularly cyano curable perfluoroelastomers. There is further a need in the art for a cure accelerator for perfluoroelastomer curatives which accelerate the cure rate of and maintain the beneficial properties of the elastomer, such as the sealing properties and the chemical and plasma resistant properties.

In addition to the above noted needs in the art, there is a further need to continue to reduce contamination in seals, particularly when used in semiconductor manufacturing, certain types of chemical manufacturing and pharmaceutical manufacturing, with a specific emphasis on reducing metallic contamination and avoiding carbon black when possible. However, in certain semiconductor and other applications, it is necessary to create parts with elastomeric seals capable of being permanently bonded in place, for example, to metallic parts. An example of this may be found in semiconductor processing in the form of a bonded slit valve generally used in vacuum chambers as well as end effector pads in which the seal is permanently bonded to a metallic surface. The problem with such permanent bonding is that it requires use of an external adhesive which generally have maximum recommended use temperatures of as low as 350° F. and which can contribute to contamination of processing. Their recommended service temperatures require use of either lower curing temperatures or adhesive degradation. Aside from such commercial external adhesives, U.S. Pat. No. 5,252,401 describes an alternative in which solutions or dispersions of PFA or FEP or films of those polymers are used as bonding agents.

However, it would be advantageous in the art to develop fluoroelastomeric and perfluoroelastomeric compositions which provide similar properties to commonly used compositions, but which do not require the use of an external adhesive for bonding and thus, would allow for preferred curing temperatures to be used for curing and bonding such parts.

BRIEF SUMMARY OF THE INVENTION

The invention includes a fluoroelastomeric composition comprising at least one curable fluoropolymer comprising at least one functional group for crosslinking the fluoropolymer; a curative capable of crosslinking the at least one fluoropolymer selected from the group consisting of functionalized biphenyl-based compounds, compounds according to formula (I):

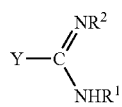

(I)

wherein Y is selected from the group consisting of substituted alkyl, alkoxy, aryl, aralkyl or aralkoxy groups of from 1 to about 22 carbon atoms; substituted or unsubstituted halogenated alkyl, alkoxy, aryl, aralkyl or aralkoxy groups of from about 1 to about 22 carbon atoms, and perfluoroalkyl, perfluoroalkoxy, perfluoroaryl, perfluoroaralkyl or perfluoroaralkoxy groups of from 1 to about 22 carbon atoms; and $R^1$ is hydrogen; substituted or unsubstituted lower alkyl or alkoxy groups of from 1 to about 6 carbon atoms; and an amino group; and $R^2$ is $R^1$ or hydroxyl, compounds according to formula (II):

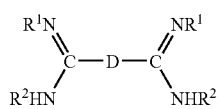

(II)

wherein D is selected from the group consisting of unsubstituted or substituted halogenated alkyl, alkoxy, aryl, aralkyl or aralkoxy groups having from about 1 to about 22 carbon atoms; and perfluoroalkyl, perfluoroalkoxy, perfluoroaryl, perfluoroaralkyl or perfluoroalkoxy groups of from 1 to about 22 carbon atoms; and $R^1$ and $R^2$ are each independently selected to be hydrogen; substituted or unsubstituted lower alkyl or alkoxy groups of from 1 to about 6 carbon atoms and an amino group, and combinations thereof; and at least one cure accelerator comprising a peroxide.

The invention also includes a method for accelerating the cure of a fluoroelastomeric composition which comprises (i) at least one fluoropolymer having at least one functional group for crosslinking the fluoropolymer and (ii) a functionalized biphenyl-based curative capable of curing the at least one fluoropolymer. The method comprises providing to the fluoroelastomeric composition at least one cure accelerator comprising a peroxide.

Also within the invention is a fluoroelastomeric composition comprising: (a) at least one curable fluoropolymer comprising at least one functional group for crosslinking the fluoropolymer; (b) a curative capable of crosslinking the at least one fluoropolymer selected from the group consisting of functionalized biphenyl-based compounds, compounds according to formula (I):

(I)

wherein Y is selected from the group consisting of substituted alkyl, alkoxy, aryl, aralkyl or aralkoxy groups of from 1 to about 22 carbon atoms; substituted or unsubstituted halogenated alkyl, alkoxy, aryl, aralkyl or aralkoxy groups of from about 1 to about 22 carbon atoms, and perfluoroalkyl, perfluoroalkoxy, perfluoroaryl, perfluoroaralkyl or perfluoroaralkoxy groups of from 1 to about 22 carbon atoms; and $R^1$ is hydrogen; substituted or unsubstituted lower alkyl or alkoxy groups of from 1 to about 6 carbon atoms; and an amino group; and $R^2$ is $R^1$ or hydroxyl, compounds according to formula (II):

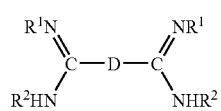

(II)

wherein D is selected from the group consisting of unsubstituted or substituted halogenated alkyl, alkoxy, aryl, aralkyl or aralkoxy groups having from about 1 to about 22 carbon atoms; and perfluoroalkyl, perfluoroalkoxy, perfluoroaryl, perfluoroaralkyl or perfluoroalkoxy groups of from 1 to about 22 carbon atoms; and $R^1$ and $R^2$ are each independently selected to be hydrogen; substituted or unsubstituted lower alkyl or alkoxy groups of from 1 to about 6 carbon atoms and an amino group, and mixtures and combinations thereof; and (c) at least two cure accelerators, wherein the at least two cure accelerators comprise a peroxide.

A method for accelerating the cure of a fluoroelastomeric composition is also included in the invention. The fluoroelastomeric composition comprises (i) at least one fluoropolymer comprising at least one functional group for crosslinking the fluoropolymer and (ii) a functionalized biphenyl-based curative capable of curing the at least one fluoropolymer. The method comprises providing to the fluoroelastomeric composition at least two cure accelerators, wherein the at least two cure accelerators comprise a peroxide.

The present invention includes a perfluoroelastomeric composition comprising: (a) at least one curable perfluoropolymer comprising at least one functional group for crosslinking the perfluoropolymer; (b) a functionalized biphenyl-based curative capable of curing the at least one perfluoropolymer; and (c) at least one cure accelerator comprising a peroxide.

A method is also provided for accelerating the cure of a perfluoroelastomeric composition comprising (i) at least one perfluoropolymer having at least one functional group for crosslinking the perfluoropolymer and (ii) a functionalized biphenyl-based curative capable of curing the at least one perfluoropolymer. The method comprises providing to the perfluoroelastomeric composition at least one cure accelerator comprising a peroxide.

The invention also includes within its scope an adhesive fluoroelastomeric composition, comprising: (a) at least one curable fluoropolymer comprising at least one functional group for crosslinking the fluoropolymer; (b) a functionalized biphenyl-based curative capable of crosslinking the at least one fluoropolymer; and (c) a colorant which is free of metallic elements.

In addition to the foregoing aspects, the invention includes a method of forming an article comprising a fluoroelastomer bonded to a metallic part. The method comprises (a) forming a fluoroelastomeric preform from a fluoroelastomeric composition, wherein the fluoroelastomeric composition comprises at least one curable fluoropolymer comprising at least one functional group for crosslinking the fluoropolymer, a functionalized biphenyl-based curative capable of crosslinking the at least one fluoropolymer and a colorant free of metallic elements; (b) providing the preform to a metallic part defining a groove, such that the preform is within the groove and contacts a surface of the metallic part and the metallic surface is free of bonding adhesive; and (c) applying heat and pressure to the preform to cure the preform and to form an article comprising a fluoroelastomer bonded directly to the metallic part.

A fluoroelastomeric composition is also within the scope of the invention which comprises (i) 100 parts by weight of at least one curable fluoropolymer comprising at least one functional group for crosslinking the fluoropolymer; (ii) about 0.1 to about 10 parts by weight per 100 parts by weight of the at least one curable fluoropolymer of a curative capable of crosslinking the at least one fluoropolymer selected from the group consisting of functionalized biphenyl-based compounds, compounds according to formula (I):

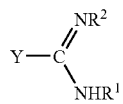
(I)

wherein Y is selected from the group consisting of substituted alkyl, alkoxy, aryl, aralkyl or aralkoxy groups of from 1 to about 22 carbon atoms; substituted or unsubstituted halogenated alkyl, alkoxy, aryl, aralkyl or aralkoxy groups of from about 1 to about 22 carbon atoms, and perfluoroalkyl, perfluoroalkoxy, perfluoroaryl, perfluoroaralkyl or perfluoroaralkoxy groups of from 1 to about 22 carbon atoms; and $R^1$ is hydrogen; substituted or unsubstituted lower alkyl or alkoxy groups of from 1 to about 6 carbon atoms; and an amino group; and $R^2$ is $R^1$ or hydroxyl, compounds according to Formula (II):

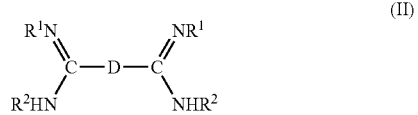

wherein D is selected from the group consisting of unsubstituted or substituted halogenated alkyl, alkoxy, aryl, aralkyl or aralkoxy groups having from about 1 to about 22 carbon atoms; and perfluoroalkyl, perfluoroalkoxy, perfluoroaryl, perfluoroaralkyl or perfluoroalkoxy groups of from 1 to about 22 carbon atoms; and $R^1$ and $R^2$ are each independently selected to be hydrogen; substituted or unsubstituted lower alkyl or alkoxy groups of from 1 to about 6 carbon atoms and an amino group, and combinations thereof; and (iii) about 0.1 to about 20 parts by weight per 100 parts by weight of the at least one curable fluoropolymer of at least one colorant free of metallic elements.

The invention further encompasses a perfluoroelastomeric composition which comprises (i) 100 parts by weight of at least one perfluoropolymer comprising at least one functional group for crosslinking the at least one perfluoropolymer; (ii) about 0.1 to about 10 parts by weight per 100 parts by weight of the at least one perfluoropolymer of a curative capable of crosslinking the at least one perfluoropolymer, the curative being selected from the group consisting of functionalized biphenyl-based compounds, compounds according to formula (I):

(I)

wherein Y is selected from the group consisting of substituted alkyl, alkoxy, aryl, aralkyl or aralkoxy groups of from 1 to about 22 carbon atoms; substituted or unsubstituted halogenated alkyl, alkoxy, aryl, aralkyl or aralkoxy groups of from about 1 to about 22 carbon atoms, and perfluoroalkyl, perfluoroalkoxy, perfluoroaryl, perfluoroaralkyl or perfluoroaralkoxy groups of from 1 to about 22 carbon atoms; and $R^1$ is hydrogen; substituted or unsubstituted lower alkyl or alkoxy groups of from 1 to about 6 carbon atoms; and an amino group; and $R^2$ is $R^1$ or hydroxyl, compounds according to Formula (II):

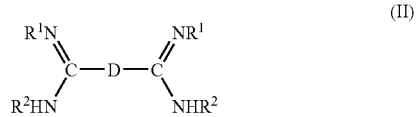

wherein D is selected from the group consisting of unsubstituted or substituted halogenated alkyl, alkoxy, aryl, aralkyl or aralkoxy groups having from about 1 to about 22 carbon atoms; and perfluoroalkyl, perfluoroalkoxy, perfluoroaryl, perfluoroaralkyl or perfluoroalkoxy groups of from 1 to about 22 carbon atoms; and $R^1$ and $R^2$ are each independently selected to be hydrogen; substituted or unsubstituted lower alkyl or alkoxy groups of from 1 to about 6 carbon atoms and an amino group, and combinations thereof; (iii) about 0.1 to about 20 parts by weight per 100 parts by weight of the perfluoropolymer of a colorant free of metallic elements; and (iv) about 0.1 to about 5 parts by weight per 100 parts by weight of the perfluoropolymer of at least one cure accelerator comprising a peroxide.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 is a bonded slit valve formed in accordance with one embodiment of the invention;

FIG. 2 is a cross-sectional view of the bonded slit valve of FIG. 1 taken along line A-A; and FIG. 3 is an enlarged portion of FIG. 2 indicated by B.

DETAILED DESCRIPTION OF THE INVENTION

Certain terminology is used in the following description for convenience only and is not limiting. The words "lower" and "upper" designate directions in the drawings to which reference is made. The words "inner" and "outer" refer to directions toward and away from, respectively, the geometric center of the article shown. The terminology includes the words above specifically mentioned, derivatives thereof and words of similar import. In the drawings, like numerals are used to indicate like elements throughout.

The invention is directed to novel compositions and methods involving fluoroelastomeric materials, and more preferably perfluoroelastomeric materials. Such compositions and methods involve the use of unique combinations of certain cure accelerators and colorants as described further herein, which can be used to accelerate the curing of such compositions as well as for enhancing other properties, including plasma resistance and adhesive properties. In particular, the cure accelerators work in conjunction with preferred curatives, such as the functionalized biphenyl-based compounds referred to herein, including 2,2-bis[3-amino-4-hydroxyphenyl]hexafluoropropane (commonly known as bisphenol AF or BOAP) to accelerate the curing process. In addition, the colorants described herein when used in standard, and preferably silica-filled fluoroelastomeric compositions demonstrate good plasma resistance properties as well as unique adhesive properties allowing use of such compositions in bonding to metallic parts without the use of additional adhesives that can be detrimental to processes in which such parts are used, particularly in semiconductor processing and pharmaceutical processing where contamination is to be avoided. It further allows for use of higher cure temperatures when forming articles included bonded fluoroelastomeric materials to metal, since in the absence of such additional adhesives, higher temperatures can be employed.

As used herein, a "fluoroelastomeric composition" or a "perfluoroelastomeric composition" refers to a polymeric composition including a curable fluoropolymer or perfluoropolymer, respectively. A fluoropolymer may be formed by polymerizing two or more monomers, preferably one of which is fluorinated or perfluorinated, and at least one of which is a curesite monomer to permit curing, i.e. at least one fluoropolymeric curesite monomer. The perfluoropolymers may be formed by polymerizing two or more perfluorinated monomers, including at least one perfluorinated curesite monomer which has at least one functional group to permit curing. Such materials are also commonly referred to in accordance with general as FKMs (fluoroelastomers) and FFKMs (perfluoroelastomers) in accordance with the American Society for Testing and Materials (ASTM) definition (ASTM-D-1418-01a), incorporated herein fully by reference and are also described further herein.

A fluoroelastomer composition as described herein may include any suitable curable fluoroelastomeric fluoropolymer(s) (FKM) capable of being cured to form a fluoroelastomer, and one or more curatives as described herein. The perfluoroelastomeric composition as described herein may include any suitable curable perfluoroelastomeric perfluoropolymer(s) (FFKM) capable of being cured to form a perfluoroelastomer, and one or more curatives as described herein.

As used herein, a perfluoroelastomeric composition is a polymeric composition including a curable perfluoropolymer. The perfluoropolymer as noted above is formed by polymerizing two or more perfluorinated monomers, preferably also including at least one perfluorinated monomer which has at least one functional group to permit curing. A perfluoroelastomer is a perfluorinated rubber of the polymethylene type having all fluoro, perfluoroalkyl, or perfluoroalkoxy substitutent groups on the polymer chain; a small fraction of these groups may contain functionality to facilitate vulcanization. A fluoroelastomer is a Fluoro rubber of the polymethylene type that utilizes vinylidene fluoride as a comonomer and has substituent fluoro, alkyl, perfluoroalkyl or perfluoroalkoxy groups on the polymer chain, with or without a cure site monomer (having a reactive pendant group).

Perfluoroelastomeric compositions may preferably include two or more of various perfluorinated copolymers of at least one fluorine-containing ethylenically unsaturated monomer, such as tetrafluoroethylene (TFE); a perfluorinated olefin, such as hexafluoropropylene (HFP); and a perfluoroalkylvinyl ether (PAVE) which include alkyl groups that are straight or branched and which include one or more ether linkages, such as perfluoro(methyl vinyl ether), perfluoro (ethyl vinyl ether), perfluoro(propyl vinyl ether) and similar compounds. Examples of preferred PAVES include those described in U.S. Pat. No. 5,001,278 and in WO 00/08076, incorporated herein by reference. Other suitable PAVEs are described, for example, in U.S. Pat. Nos. 5,696,189 and 4,983,697, also incorporated herein by reference.

Preferred perfluoropolymers are terpolymers or tetrapolymers of TFE, PAVE, and at least one perfluorinated cure site monomer which incorporates a functional group to permit crosslinking of the terpolymer, at least one of which is a curesite capable of being cured by the curatives described herein and which are preferably capable of having an accelerated cure when acted on by the cure accelerators of the present invention alone or in combination with other curatives and accelerators.

Preferred fluoropolymers are copolymers including at least TFE, vinylidene fluoride ($VF_2$) and other monomers as noted above with respect to perfluoropolymers. Preferably the fluoropolymers have curesite monomers capable of being cured by standard curatives and/or the preferred curatives described herein, and which are capable of having such curing accelerated by the preferred accelerators according to the invention. In addition, it is preferred that the fluoropolymers used are included within the group of more highly fluorinated fluoropolymers known in the art (including Aflas and Viton GF).

Most preferred curesite monomers include those having cyano curesites, regardless of the location of the cyano group, e.g., primary and secondary cyano group curesite monomers. Examples of cyano curesite monomers are described in detail herein, and may be found in, for example, U.S. Pat. No. 4,281,092. Such cyano group containing cure site monomers are well known in the art. Combinations of one or more of these curesite monomers with each other or with other well known curesite monomers may also be used within the scope of the invention. It is also acceptable to use various perfluoropolymers according to the invention alone or in combination with other acceptable perfluoropolymers.

Useful cyano cure site monomers include fluorinated olefins and fluorinated vinyl ethers, each having a cyano group of which the following are general examples:

$CF_2=CF-O-[CF_2]_n-CN$, wherein n is from about 2 to about 12, and preferably about 2 to about 6;

$CF_2=CF-O-[CF_2-CF(CF_3)-O]_n-CF_2-CF(CF_3)-CN$, wherein n is from 0 to about 4, preferably from 0 to about 2;

$CF_2=CF-[OCF_2CF(CF_3)]_m-O-[CF_2]_n-CN$, wherein m is from about 1 to about 2, and n is from about 1 to about 4; and $CF_2=CF-O-[CF_2]_n-O-CF(CF_3)-CN$, wherein n is from 2 to about 4.

Specific examples include primary curesite monomers such as $CF_2=CFOCF_2CF(CF_3)OCF_2CF_2CN$ (referred to generally as 8-CNVE) and secondary curesite monomers such as $CF_2=CF-O[CF_2]_3-O-CF[CF_3]-CN$. Such curesite monomers may be used alone or in combination. Especially preferred is a combination of curesite monomers as shown below in a fluoropolymeric or perfluoropolymeric chain as follows:

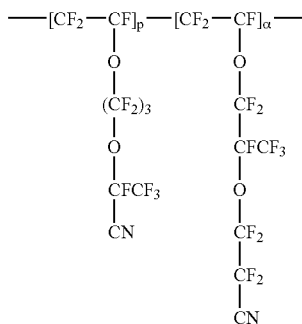

wherein p represents a secondary curesite monomer present in a fluoropolymer or perfluoropolymers in an amount from about 0.1 to about 12 mol %, preferably about 1 to about 4 mol %, and α represents a primary curesite monomer present in an amount from about 0.1 to about 12 mol % and preferably from about 1 to about 7 mol %. It is preferred that the molar ratio of the primary curesite monomer to the secondary curesite monomer in the copolymer is from about 1:1 to about 10:1, preferably 9:1.

It will be understood based on this disclosure that additional types of cure site monomers which contain cyano groups as curesites and those which do not contain cyano groups may be used in addition to or, in certain cases, in place of the preferred curesite monomers noted above, provided that the curesite monomers are capable of being cured by the combination of curatives and accelerators described herein.

Common examples of other types of curesite monomers include olefins, including partially or fully halogenated olefins, such as ethylene, vinylidene fluoride, vinyl fluoride, trifluoroethylene, bromotetrafluorobutene, bromotrifluoroethylene, 1-hydropentafluoropropene and 2-hydropentafluoropropene. Such additional cure site monomer(s) may be present in ranges as noted above and are preferably are generally present in amounts of about 0.1 to about 5 mole percent, more preferably about 0.1 to about 2.5 mole percent, and most preferably about 0.3 to about 1.5 mole percent.

Other additives, such as other co-curatives, curing agents or accelerators, other than those of the present invention, a proton sponge such as an acid acceptor or strong base, processing aids, regrind fluoropolymer or perfluoropolymer material, fillers and the like may also be included as optional components of the fluoroelastomeric and perfluoroelastomeric compositions of the invention. Such additives include fillers such as graphite, carbon black, clay, silicon dioxide, fluoropolymeric particulates (for example, TFE homopolymer and copolymer micropowders), barium sulfate, silica, titanium dioxide, acid acceptors, cure accelerators, glass fibers, or polyaramid fibers such as Kevlar, other curing agents and/or plasticizers or other additives known or to be developed in the fluoroelastomeric art and perfluoroelastomeric art. Preferably, the compositions of the invention include silica, particularly for forming adhesive fluoroelastomeric compositions as described herein, with exemplary preferred silica compounds being available commercially as Hi-Sil® 532 EP from Harwick Standard, Aerosil® R972 from Degussa Corporation, Min-U-Sil® and Sil-Co-Sil® both from US SILICA Co., Micro-cel® from Celite c/o World Minerals, and Cab-o-sil® from Cabot.

Preferred commercial fluoropolymers/fluoroelastomers include Viton® GF, Aflas® and similar polymers. Preferred perfluoropolymers/perfluoroelastomers include Simriz®, available from Freudenberg of Germany, Dyneon®, available from Minnesota Mining & Manufacturing in Minnesota, Daiel Perfluor®, available from Daikin Industries, Ltd. of Osaka, Japan. Similar materials are also available from Solvay Solexis in Italy and from Federal State Unitary Enterprise S.V. Lebedev Institute of Synthetic Rubber in Russia.

The compositions of the present invention also include at least one curative which is capable of crosslinking the at least one fluoropolymer, preferably perfluoropolymer. Such materials include functionalized biphenyl-based compounds, including BOAP. Additional curatives include amidine-based and amidoxime-based curatives, as well as bisamidine curatives, which each may also function as direct curatives, co-curatives or accelerators in perfluoroelastomeric compositions.

These amidine-based and amidoxime-based compounds include monoamidines and monoamidoximes of the following formula (I) below.

(I)

wherein Y may be a substituted alkyl, alkoxy, aryl, aralkyl or aralkoxy group or an unsubstituted or substituted fully or partially halogenated alkyl, alkoxy, aryl, aralkyl or aralkoxy group having from about 1 to about 22 carbon atoms. Y may also be, and preferably is, a perfluoroalkyl, perfluoroalkoxy, perfluoroaryl, perfluoroaralkyl or perfluoroaralkoxy group of from 1 to about 22 carbon atoms and more preferably a perfluoroalkyl or perfluoroalkoxy group of from about 1 to about 12 carbon atoms, and more preferably from 1 to 9 carbon atoms; and $R^1$ may be hydrogen or substituted or unsubstituted lower alkyl or alkoxy groups of from one to about 6 carbon atoms, or an amino group. $R^2$ may be independently any of the groups listed above for $R^1$ or hydroxyl. Substituted groups for Y, $R^1$ or $R^2$ include, without limitation, halogenated alkyl, perhalogenated alkyl, halogenated alkoxy, perhalogenated alkoxy, thio, amine, imine, amide, imide, halogen, carboxyl, sulfonyl, hydroxyl, and the like.

Preferred compounds according to formula (I) include those in which $R^2$ is hydroxyl, hydrogen or substituted or unsubstituted alkyl or alkoxy groups of from 1 to 6 carbon atoms, more preferably hydroxyl or hydrogen. Also preferred are embodiments in which $R^1$ is hydrogen, amino or a substituted or unsubstituted lower alkyl of from 1 to 6 carbon atoms while $R^2$ is hydrogen or hydroxyl. Most preferred are embodiments where $R^1$ is hydrogen. Further preferred embodiments include those in which Y is perfluoroalkyl, perfluoroalkoxy, substituted or unsubstituted aryl groups and substituted or unsubstituted halogenated aryl groups having the chain lengths as noted above.

Exemplary monoamidine-based and monoamidoxime-based curatives according to formula (I) include perfluoroalkylamidines, arylamidines, perfluoroalkylamidoximes, arylamidoximes and perfluoroalkylamidrazones. Specific examples include perfluorooctanamidine, heptafluorobutyrylamidine, benzamidine, trifluoromethylbenzamidoxime, and trifluoromethoxylbenzamidoxime.

The bisamidine-based curatives which may be used for the fluoroelastomeric and preferably perfluoroelastomeric compositions represented by formula (II):

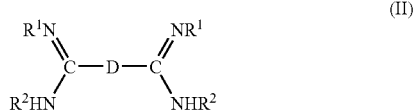

(II)

wherein D may be unsubstituted or substituted fully or partially halogenated alkyl, alkoxy, aryl, aralkyl or aralkoxy groups having from about 1 to about 22 carbon atoms, or more preferably perfluoroalkyl, perfluoroalkoxy, perfluoroaryl, perfluoroaralkyl, or perfluoroaralkoxy groups of from 1 to about 22 carbon atoms and more preferably a perfluoroalkyl or perfluoroalkoxy group of from about 1 to about 12 carbon atoms. $R^1$ and $R^2$ are as defined above with respect to formula (I), however, in formula (II), $R^2$ is not hydroxyl, it is independently selected to be the same as $R^1$ noted above. Further, D, $R^1$ and $R^2$ may each be substituted by one of more of the groups noted above with respect to formula (I). Most preferably herein in formula (II), both $R^1$ and $R^2$ are hydrogen.

Oxygen atoms are preferably included in the form of ether linkages in Y, $R^1$ and $R^2$ While it is preferred that Y is straight or branched, it is also within the scope of the invention that Y could be a cyclic or aromatic structure, which is capable of being substituted as noted above.

With respect to the bisamidines of formula (II), it is preferable that D is a fluorinated, more preferably perfluorinated. If D is only partially halogenated, however, it is preferred that the carbon atoms adjacent the amidine groups each have two hydrogen substituents to stabilize the compound. Oxygen atoms in D are preferably also in the form of ether linkages. While it is preferred that D is straight or branched chain, it is also within the scope of the invention that D is a cyclic or aromatic structure, which may be further substituted. Particularly suitable examples of such bisamidines include perfluorosuberamidine and perfluorosebacamidine. Suitable perfluoroalkyl monoamidines and bisamidines can be purchased from SynQuest Laboratories, Inc. of Alachua, Fla. Such materials are commercially available from Federal State Unitary Enterprise S.V. Lebedev Institute of Synthetic Rubber in Russia. Preferred exemplary bisamidines according to the invention include perfluorosuberamidine and perfluorosebacamidine.

It is understood that when the above amidine, amidoxime materials are used as accelerators, instead of direct curatives, such as for example if used in combination with a diphenyl-based curative such as BOAP, the amount as chosen may be based upon the particular perfluoroelastomer chosen, the curatives and/or co-curatives chosen and the desired cure properties, such as the time necessary to develop a minimum specified Mooney viscosity, the ability of the composition to resist deformation, and a maximum specified torque measured by a moving die rheometer. Suitable amounts include about 0.1 to about 5 parts of accelerator per about 100 parts of perfluoropolymer. When used as direct curatives, the amount and type of curative or co-curative in the invention should be chosen to optimize the desired properties of the cured fluoroelastomer or perfluoroelastomer (including its resistance to chemical attack, specific elongation-at-break, resistance to compression set, flexural modulus, tear strength, hardness and the like). The amount used will depend on the degree of crosslinking desired, the type and number of cure sites to be cured by the inventive curatives, the number of other cure sites to be cured by other curatives not within the scope of the invention, and the cure rate desired. A preferred amount of any of the curatives herein is an amount as much as equivalent to an amount in slight excess of the amount required to react with those curesites present in the fluoroelastomeric or perfluoroelastomeric composition which are capable of reacting with the curatives and co-curatives of the invention. Preferably, about 0.1 to about 10 parts by weight of the curing agent per about 100 parts of fluoropolymer or perfluoropolymer is used, more preferably about 1 to about 4 parts by weight. When used as a co-curative, the amount is preferably less, since other cure reactions are occurring, however, that too depends on the number of sites and other parameters noted above.

In addition to BOAP, other diphenyl-based curatives may be used in the compositions of the present invention. They include branched or straight chain alkyl, halogenated alkyl, perhalogenated alkyl, and preferably perfluoroalkyl type compounds that may or may not have one or more oxygen atoms and which may or may not be substituted, and which have at least two aminophenyl groups, preferably two aminophenol groups, but which have a sufficiently high molecular weight (extended chains) so that the melting point is preferably no greater than about 240° C., more preferably no greater than about 230° C., and most preferably to about 225° C. to thereby enhance compatibility and provide fast curing reactions of perfluoroelastomeric compositions, particularly the preferred perfluoroelastomers having cyano-type curesite monomers.

Such curing agents are preferably diphenyl-based curatives of formula (III):

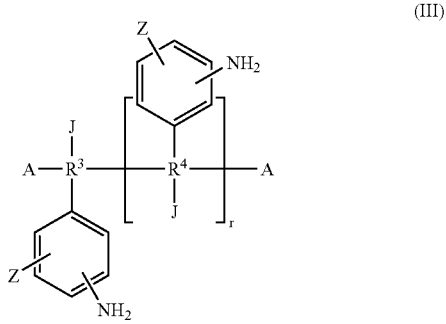

(III)

In formula (III), r may be 0 or 1. In formula (III), further $R^3$ and $R^4$ are independently selected to be a carbon atom or branched or straight chain carbon-based groups (which may be further substituted or unsubstituted) of from about 2 to about 22 carbon atoms in any of such chains (whether straight or branched), more preferably such chains are from 10 to 22 carbon atoms, and which groups are selected from the following exemplary groups: alkyl groups, fully or partially halogenated alkyl groups, and preferably perfluorinated alkyl groups, each of which groups may be interrupted by at least one oxygen atom, and in which branching chains may include such groups as, for example, haloalkyl, fluoroalkyl and trifluoroalkyl. Substitutions acceptable for use in formula (III) and other formulae described herein as containing substitutable groups, including the preferred formulations in accordance with formula (III) described below, may be the same as noted herein for formulas (I) and (II) to the extent such substitutions may be desired for a given curing reaction. Z is preferably an amino, mercapto, thiphenol, sulfhydryl or hydroxyl group, with the hydroxyl group being most preferred.

Each J is independently selected to be formula (IV):

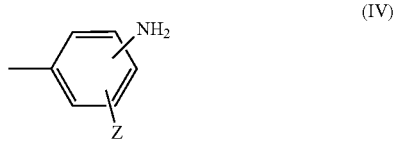

(IV)

or the same as A, and A may be independently selected on either side of $R^3$ in formula (III) to be formula (IV), a hydrogen atom, a fluorine atom, or a branched or straight chain (substituted or unsubstituted) carbon-based group which is selected from the following groups: an alkyl, a partially or fully halogenated alkyl, or perfluoroalkyl groups, more preferably a perfluoroalkyl group, of from one to about 22 carbon atoms; each of which groups may be interrupted by at least one oxygen atom, and in which branching chains may include such groups as, for example, haloalkyl, fluoroalkyl and trifluoroalkyl. When r is 0 and $R^3$ is a carbon atom, at least one of J and each A is not formula (IV). While it is acceptable for an A group to be formula (IV), it is preferred that only two such groups appear in curatives of formula (III), such that if r is 0 and J is formula (IV) above, it is preferred that neither A group is formula (IV).

Preferred structures when r=0 in formula (III) and J meets formula IV above, include structures where $R^3$ is a carbon atom and those in which $R^3$ is a straight or branched alkyl or perfluorinated alkyl group which may or may not contain oxygen. Further preferred are structures in which when r is 0, $R^3$ is a carbon atom, J is formula (IV), one A is trifluoromethyl and the other A is selected from the group consisting of linear and branched chain perfluoroalkyl and perfluoroalkylether groups of from 2 to 22 carbon atoms.

The above-noted curatives, including the monoamidine, monoamidoxime, bisamidines and specified functionalized di-phenyl based curatives and their syntheses are described further in co-pending U.S. Patent Publication No. US 2004/0214956 A1, owned by the assignee of the present invention, the entire disclosure of which is incorporated herein by reference for that purpose.

It also possible to employ other curing agents in addition to the preferred curatives described above, or to use more than one curative depending on the cure site monomers present, such as an organometallic compound such as an organotin, diamines, amidines, other conventional biphenyl functionalized derivatives and/or bisaminothiophenols, etc. In addition, perfluoropolymers may be cured using radiation curing technology as an assist or to cure other curesites not cured by the preferred curatives of the compositions of the present invention.

The invention also includes a preferred accelerant in the form of an organic peroxide. Organic peroxides have been used as direct curatives, and in conjunction with co-agents generally including isocyanurates such as triallylisocyanurate (TAIC) and triallylcyanurate (TAC) as alternative curing systems to curing systems involving functionalized diphenyl-based curatives and other known curatives. In the present invention, such organic peroxides are being employed without the isocyanurate co-agents as accelerants and are not being used as sole or direct curatives. It has been surprisingly found that such compounds, instead of being merely useful as alternative cure systems for various perfluoropolymers with other co-agents and having specific curesites, are very effective as accelerants in a curing system involving functionalized diphenyl-based compounds, mono- and bis-amidines and monoamidoximes as noted above. This was surprising in that such curatives operate by a chemically different cure mechanism than is thought to be useful when using organic peroxides as alternative curing mechanisms.

The organic peroxides which may be used include any of those organic peroxides which are typically used in the art as standard curatives along with isocyanurate based co-agents such as TAIC and TAC in systems such as TFE/PAVE/curesite monomer wherein the curesite monomer is one as exemplified in U.S. Pat. No. 5,001,278 of Oka et al. of formula $XCH_2CF_2CF_2$—$(OCH_2CF_2CF_2)_m$—$(OCFYCF_2)_n$—$OCF=CF_2$ in which X is a hydrogen atom or a halogen atom, including fluorine, chlorine, bromine and iodine; Y is fluorine or a trifluoromethyl group; m is an integer of 0 to 5; and n is 0, 1 or 2. The peroxides used may also be those which work in curing other hydrogen-containing functional groups such as —COOH, —$CO_2CH_3$, —$CH_2OH$, —$CH_2X$ (where X is a halogen). Such organic peroxides are known in the art for use with TAIC, TAC and analogous co-agents. However, such co-agents are not necessary in the present invention.

Preferred peroxides include 2,5-dimethyl-2,5-di(t-butylperoxy)hexyne-3,2,5-dimethyl-2,5-di(t-butylperoxy)hexane, dicumyl peroxide, dibenzoyl peroxide, t-butyl perbenzoate, α,α'-bis(t-butylperoxy-diisopropylbenzene), di[1,3-dimethyl-3-(t-butylperoxy)-butyl] carbonate and combinations thereof. The organic peroxide should be used in minor amounts in accordance with amounts used for other accelerant additives. As noted above with respect to the potential use of some of the preferred curatives as alternative accelerators, the amount of organic peroxide chosen as an accelerator may be based upon the particular fluoroelastomer or perfluoropolymer chosen, the curatives and/or co-curatives chosen and the desired cure properties, such as the time necessary to develop a minimum specified Mooney viscosity, the ability of the composition to resist deformation, and a maximum specified torque measured by a moving die rheometer. Suitable amounts include about 0.1 to about 5 parts of accelerator per about 100 parts of perfluoropolymer, and more preferably from about 0.5 to 1.0 parts of accelerator per about 100 parts of perfluoropolymer.

Compositions incorporating the organic peroxide curative, in addition to demonstrating the acceleration, show good processability, low reject rates and good physical properties.

Based on such compositions, as described above, the invention further provides a method for accelerating the cure of a fluoroelastomeric composition, preferably a perfluoroelastomeric composition such as those compositions noted above herein. The method includes providing to the compositions at least one cure accelerator in the form of an organic peroxide. As used herein, the use of "a" and "at least one" to describe composition components each means one or more components. In addition, such compositions and methods may further include a colorant, preferably metallic free, as described herein below to achieve differing effects. As used herein, "metallic free" or "free of metallic elements" is intended to mean substantially completely free of metallic elements, with the understanding that small amounts of trace metallic elements, while undesirable, may be present.

In addition the above noted compositions and methods, the accelerant effects can be achieved when using the peroxide accelerators alone or in combination with other cure accelerators in compositions including certain colorants described herein preferably in addition to the organic peroxide cure accelerator. Such compositions having colorants as well with organic peroxide accelerators exhibit excellent curing times and property advantages as described herein. However, even without the use of an organic peroxide accelerator in accordance with the invention, it has been found that such colorants provide good plasma resistance properties generally when comparing a composition including such as colorant with a similar compound not having the colorant as well as to provide a smooth, aesthetic look to resulting molded parts formed from the compositions described herein and/or to serve as an identifier of source or type of material. Thus such colorants can be used in certain compositions to provide advantageous benefits, including plasma resistance for fluoroelastomeric compositions comprising at least a fluoropolymer, and preferably a perfluoropolymer as defined above, and a curative of the type described herein, preferably a functionalized diphenyl-based curative capable of crosslinking the fluoropolymer or perfluoropolymer chosen. The colorants used are all preferably free of metallic elements, which is of especial importance when using such compositions and the cured articles formed from them in semiconductor and pharmaceutical equipment and processes, wherein metallic contaminants and other impurities are to be avoided. As further described below, it has been found that such colorants may be used to form fluoroelastomeric compositions having unique adhesive properties. While coloring perfluoroelastomers and fluoroelastomers for identification has been attempted in the past, applicants herein describe use of non-metallic colorants (including the preferred avoidance of carbon black as a colorant in semiconductor and other non-black end uses) to provide plasma resistance, assist as additives in compositions having excellent curing times in view of the peroxide cure accelerators as described herein alone or in combination with other cure accelerators, provide a more aesthetic looking seal minimizing visible surface color imperfections, operate as a designation of source or type, and/or yield adhesive fluoroelastomeric compositions.

Preferred colorants within the invention include those which are polycyclic aromatic structures containing C, H, N and O, but which are metallic free. Such compounds may be substituted with chlorine or bromine for color variations. They should be thermally stable and compatible with the curatives used herein, preferably with the functionalized diphenyl based curatives, and more preferably with BOAP. Suitable colorants meeting such criteria may be found in the following reference; In: W. Herbst et al., Industrial Organic Pigments, VCH/Wiley, $2^{nd}$ ed., 1997. Preferred materials meeting such criteria may also be found in the Color Index, known in the art and are commercially available from Clariant, Ciba and Engelhard, amongst others. Specific preferred colorant categories meeting the above-noted criteria include quinacridones, benzimidazalones, indanthrones, perylenes, isoindolinones, and isoindolines as well as combinations of these materials. Suitable materials are also described in U.S. Pat. No. 4,316,836, incorporated herein by reference for the purpose of showing similar structures. Other possible compounds and commercial colorants include quinacridone magenta (C.I. Pigment Red 122, 192, 202 and 206), Monastral Red B, violet dyes such as C.I. Violet 19, 2,9-dimethyl-substituted quinacridone and anthraquinone dyes (C.I. 60710, C.I. Dispersed Red 15, C.I. 26050, C.I. Solvent Red 19), Rodamine YS (C.I. Pigment Red 81), orange dyes such as C.I. Orange 48 and C.I. Orange 49, diarylide (benzidine) yellows (C.I. Pigment Yellow 12, 13, 14, 16, 17, 55, 83 and 155), Indanthrene Golden Yellow GK, arylamide yellow (C.I. Pigment Yellow 1, 3, 10, 73, 74, 97, 105 and 111) and combinations of these colorants, which can be used for varying effects and different composition color as well. Most preferred of these materials include quinacridone commercially available from Clariant as PV Fast Violet ER having the structure shown below

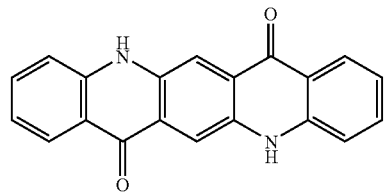

(V)

and the derivative of this compound as shown below commercially available from Clariant as PV Fast Pink E:

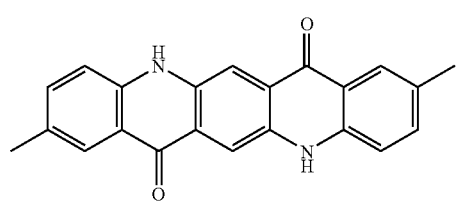

(VI)

The addition of such colorants to fluoroelastomeric and, preferably to perfluoroelastomeric compositions, can provide the composition with good plasma resistant properties, particularly in $NF_3$, $SF_6$ and $CF_4$ plasma. Accordingly compositions are provided in the present invention including the fluoropolymers, and preferably the perfluoropolymers noted above, in combination with the above curatives, preferably the functionalized diphenyl-based curatives, and more preferably BOAP, a peroxide cure accelerator alone or with further cure accelerants and including the above-noted colorants, including the most preferred quinacridone derivatives. Such compositions preferably include the organic peroxide cure accelerators of the invention in combination with the colorants to provide compositions having preferred curing characteristics when using the above-described curatives. The invention also therefore, includes a method for accelerating the cure of a fluoroelastomeric, and preferably a perfluoroelastomeric composition such as those noted above by providing to such compositions at least two cure accelerators including the peroxide accelerators noted above, which compositions may also include the colorants noted herein which are preferably free of metallic elements such that the compositions and articles formed there from are useful for semiconductor manufacturing, certain chemical manufacturing and pharmaceutical manufacturing where metallic contaminants are not desired.

Exemplary and non-limiting preferred formulations using a peroxide accelerator alone and in combination with a colorant are shown below:

| Components | Sample Formulation A (parts by weight based on 100 parts by weight perfluoropolymer) | Sample Formulation B (parts by weight based on 100 parts by weight perfluoropolymer) |
| --- | --- | --- |
| Perfluoropolymer | 100 | 100 |
| Silica | 15 | 0 |
| Carbon Black | 0 | 25 |
| Peroxide Accelerator | 1 | 1 |
| Curative (BOAP) | 2 | 3 |
| Colorant (quinacridone) | 1 | 0 |

Such colorants as discussed above, can yet further provide unique adhesive capabilities. Such compositions, when used for adhesive purposes, may optionally include the organic peroxide cure accelerators of the invention, however, it is preferred that such organic peroxides are used minimally or eliminated if it is desired to maximize the adhesive effects of the compositions of the present invention.

Preferred compositions that provide an adhesive fluoroelastomeric, and preferably an adhesive perfluoroelastomeric composition which is preferably capable of curing and adhering directly to metallic surfaces without the use of external adhesives include at least one fluoropolymer, preferably a perfluoropolymer as described above, with a functional group or groups capable of being crosslinked. Exemplary metallic surfaces include aluminum, stainless steel, carbon steel, copper and others. Such a list is not intended to be exhaustive. Further, it is within the scope of the invention that such adhesive compositions due to their bonding capability may be cured so as to bond to non-metallic surfaces such as other elastomers and polymeric surfaces to provide many potential uses. A curative, such as those noted above for use in the present invention, and preferably a functionalized diphenyl-based curative as described above, and most preferably BOAP should also be used in the preferred amounts indicated above. The colorants should be provided to the composition can be used in varying amounts depending upon the intended use (i.e., if the colorant is used to form a plasma resistant composition or as an adhesive composition additive, it may be used in varying amounts). Suitable amounts can range from about 0.01 to about 20 parts by weight per 100 parts perfluoroelastomer, and preferably from about 1 to about 5 parts by weight.

While various additives noted above may be provided to such adhesive compositions, it is most preferred that silica be included as an additive for use with the colorants of the invention in adhesive fluoroelastomeric compositions. In addition, the various other cure accelerators may be employed as additives in the adhesive fluoroelastomeric compositions, however, as noted above, for maximizing adhesive properties, the use of an organic peroxide accelerator should be minimized. Such compositions may be used in articles as described below and have application also in critical fluid handling, aerospace and biomedical applications and can be formed into assemblies and parts to form, for example, medical devices, semiconductor parts (see below) and laminated structures (such as in forming outer or protective chemically resistant layers to such structures). By allowing for direct bonding, use of typical adhesives used in the art for bonding fluoroelastomers are no longer necessary.

The invention further includes a method of forming an article comprising a fluoroelastomer, and preferably a perfluoroelastomer, bonded to a metallic part. Such metallic parts may be formed of the metals noted above, and the articles may include any article combining a metallic substrate, base or other working part, which requires a fluoroelastomeric or perfluoroelastomeric seal which is preferably bonded in place in a groove (intended herein to be any recess or shaped surface extending into or out of the metallic part used as a mating surface for bonding with a fluoro or perfluoroelastomer). Examples of such articles include a bonded slit valve for use in a vacuum chamber for semiconductor processing formed of fluoroelastomer and aluminum, and end effector pads also formed of those same materials. A bonded slit valve will be used as a non-limiting example herein to illustrate the method of the invention. Such valves typically have a metallic base shaped for use in semiconductor equipment, and a groove which is machined in the base for receiving a fluoroelastomeric composition in the shape of a preform that is then cured to form a bonded seal. Such an article is shown generally with reference to FIG. 1 as bonded slit valve 10. As best shown in FIGS. 1-3, the valve has a metallic part 12 which has a groove 14 recessed within the part 12 for receiving the appropriately shaped fluoroelastomeric seal 16. In order to form the article, herein the bonded slit valve 10, it is first necessary to prepare a preform of the seal in any manner acceptable in the seal manufacturing art. Such techniques are well known and need not be described further herein, and include extrusion, stamping, and the like. The preform is typically shaped so as to substantially mate with a similarly shaped surface on the metallic part. In the case of bonded slit valve 10, the seal 16 would be initially formed from an uncured fluoro or perfluoropolymeric composition in a shape designed to substantially mate with groove 14. Such a metallic part as part 12, can be machined separately, using standard metalworking techniques. The part should be machined and the mating surface which will contact the fluoropolymeric preform should be preferably initially treated, such as by standard mold sandblasting preparatory techniques, then cleaned well with an acceptable solvent, such as acetone. Sandblasting can be effective at facilitating adhesion. The cleaned and treated surface should then be allowed to dry. The preform can then be contacted with the metallic part, such as, for example, aligning seal 16 with groove 14 in bonded slit valve 10.

After the preform and metallic surfaces are contacted, the two are then subjected to heat and pressure to initiate curing of the elastomeric composition. During such curing, the compositions of the present invention bond directly to the metallic part, such that additional adhesive is optional, and not necessary avoiding contamination and allowing for curing of the elastomeric composition at temperatures higher than those which are commonly permissible if bonding adhesives are being used. It is preferred that the preform and metallic part are subjected to heat and pressure by inclusion in a suitable mold to avoid damage to the elastomer and the part. The metallic part is preferably first loaded in the mold and preheated in accordance with standard molding techniques for the parts and elastomers being used. The preform is preferably contacted with the metallic part after preheating followed by closing of the mold and continued and increased heat and pressure, preferably under vacuum, also in accordance with standard techniques for molding such parts with conditions varying depending on the elastomer being used and the applicable cure system. The application of heat and pressure should continue until substantial curing is effected and the elastomer is bonded to the metallic part. To ensure optimal bonding and cure properties, it is preferred that additional treatment in the form of post-curing the article when removed from the mold in an oven in accordance with post-curing techniques known in the art for the elastomer being used be employed in the method of the invention.

After post curing, or after molding if post curing is not desired, the article can be further finished. In the case of bonded slit valve such as bonded slit valve 10, additional cleaning, deflashing and inspection can be done to meet quality specifications if applicable.

Articles such as those made according to the present method, by allowing for elimination of standard bonding agents for fluoroelastomers not only allows for optimal curing temperatures to be used without fear of adhesive degradation, which allows for optimal physical properties, but also, in certain embodiments, even increases bonding strength between the fluoroelastomer and the metallic surface in comparison with use of standard adhesive. As an example, the typical maximum temperature which is recommended for use with standard perfluoroelastomer external bonding adhesives is about 350° F., however, in some cases, optimal curing occurs at 550° F. for up to 24 hours and post-cure temperatures can be fairly excessive for high temperature elastomers, resulting in decreases in bonding strength when such adhesives are applied. Elimination of the adhesive also can help reduce outgassing in semiconductor applications of volatile chemicals which result from adhesive use and result in improved, longer product service life.

The invention will now be described in accordance with the following non-limiting examples:

EXAMPLE 1

In this example, perfluoroelastomeric compositions were prepared using as a base perfluoroelastomer, tetrapolymers prepared by batchwise polymerization in aqueous emulsion as described in detail in WO 00/08076, incorporated herein by reference. The monomers in the terpolymer included tetrafluoroethylene, perfluoromethylvinyl ether and two curesite monomers, a secondary cyano curesite monomer, $CF_2=CFO(CF_2)_3OCF(CF_3)CN$ and a primary cyano curesite monomer, $CF_2=CFOCF_2CF(CF_3)O(CF_2)_2CN$. Polymerizations were conducted in an aqueous emulsion containing 1,1,2-trichloro-1,2,2-trifluoroethane using ammonium persulfate or ammonium persulfate/sodium sulfite redox initiation. The surfactant mixture included ammonium perfluoroheptanoate and ammonium perfluorononanoate. The buffer used was dipotassium phosphate. Tetrapolymers were isolated by coagulation with magnesium chloride, washed with hot water and alcohol and dried at 60° C. The composition was determined by $F^{19}$ NMR and elemental analysis for carbon and fluorine. Mooney viscosity was measured at 100° C. on a TechPro® viscTECH TPD-1585 viscometer. In this Example, the perfluoropolymer will be referred to as Polymer A which is a non-redox, 65 Mooney viscosity polymer.

To the polymer as noted above, used in these compositions, were added BOAP as a curative. The BOAP (2,2-bis[3-amino-4-hydroxyphenol]hexafluoropropane) was purchased from TCI America, Portland, Oreg. Some of the compositions incorporate the organic peroxide, Varox (DBPH 50%). The colorant used is Clariant PV Fast Violet as described above herein.

Test specimens were made by mixing a tetrapolymer and the curatives to form a perfluoroelastomeric composition using a Brabender internal mixer. The compounds, upon mixing, were shaped into O-ring preforms, molded to cure the preforms into seals and then postcured into Size 214 O-rings in accordance with the cure conditions noted in Table 1, and with post cure conditions of 24 hours @ 550° F. in air. The rings were tested for tensile properties using ASTM-D-412, Method B, and the following parameters were recorded: $T_B$ (tensile at break in psi); $E_B$ (elongation at break in %); $M_{100}$ (modulus at 100% elongation in psi), $M_{50}$ (modulus at 50% elongation in psi), and hardness (Durometer M). Compression set of O-ring samples was determined in accordance with ASTM-D-395, Method B. Cure characteristics were measured using a Monsanto MDR 2000 under the following conditions:

Moving die frequency: 1.6667 Hz
Oscillation amplitude: 0.5 deg arc
Temperature: 350° F.
Sample size: disks of 1.6 inch diameter, thickness of 0.17 inch and 9.5 g weight
Duration of test: 60 minutes The following cure parameters were recorded: $M_H$ (maximum torque level in units of Nm); $M_L$ (minimum torque level in unites of Nm); $t_s2$ (minutes to 0.23 Nm rise above $M_L$); and $t_c90$ (minutes to 90% Of $M_H$). The data and compositions (in parts by weight) are set forth herein in Table 1.

TABLE 1

| | Sample | | | |
|---|---|---|---|---|
| | 1 | 2 | 3 | 4 |
| Polymer A | 100 | 100 | 100 | 100 |
| Silica | 20 | 20 | 20 | — |
| PV Fast Violet | 1 | — | 1 | 1 |
| BOAP | 2 | 2 | 2 | 2 |
| Varox | 1 | 1 | — | 1 |
| Physical Properties | | | | |
| Cure Conditions | 10 min @ 350° F. | 10 min @ 350° F. | 30 min @ 350° F. | 10 min @ 350° F. |
| Tensile (psi) | 2131 | 2164 | 2298 | 938 |
| % elongation | 145 | 149 | 135 | 196 |
| 100% Modulus | 1250 | 1224 | 1520 | 256 |
| 50% Modulus | 531 | 530 | 593 | 136 |
| Durometer M/A | 81/83 | 80/83 | 80/84 | 64/66 |
| Specific Gravity | 2.047 | 2.057 | 2.047 | 2.031 |
| $T_2$ (30 min @ 350° F.) | 1.71 | 1.67 | 2.48 | 4.15 |

TABLE 1-continued

|  | Sample | | | |
| --- | --- | --- | --- | --- |
|  | 1 | 2 | 3 | 4 |
| $T_{90}$ (30 min @ 350° F. | 23.88 | 23.94 | 25.62 | 23.25 |
| $M_H$ | 22.93 | 22.49 | 21.23 | 8.95 |
| $M_L$ | 1.06 | 0.88 | 0.85 | 0.24 |
| Compression Set | | | | |
| 70 h @ 400° F. in air 25% | 26.47 | 26.47 | 17.65 | 14.70 |
| 70 h @ 465° F. in air 25% | 37.14 | 35.29 | 26.47* | 17.65** |
| 70 h @ 500° F. in air 25% | 44.12 | 44.12 | 32.35** | 20.59 |
| 70 h @ 550° F. in air 25% | 61.76 | 58.82 | 44.11** | — |
| 70 h @ 572° F. in air 25% | 73.53** | 73.53* | 55.88 | — |

*one sample incurred end split
**one sample delaminated

As noted from the above data, the filled samples incorporating both an organic peroxide and colorant, as well as the sample incorporating organic peroxide only (Samples 1 and 2) performed fast BOAP cures with good physical properties and compression set. The cure for the sample without peroxide using only the colorant also demonstrated a fast BOAP cure and demonstrated good physical properties and compression set as well. While the sample with no silica filler in it to provide desired composition strength showed a commensurate drop in physical properties as expected, it still demonstrated good curing times and excellent compression sets.

EXAMPLE 2

The same compositions noted above were further evaluated for bonding strength. The compositions were testing using inserts according to ASTM D429 of aluminum and were tested using an Instron Model 1125 with full load scale of 2000 lbs. The cross head speed was 1 in per min. The testing was conducted at about room temperature (73° F.) and at 20% relative humidity. The compositions were bonded to the inserts with and without use of adhesive. Two inserts were tested for each of Samples 1-4 above and the results are reported below in Table 2.

TABLE 2

| Sample | Insert | External Adhesive | Lbs. Force to separate disc |
| --- | --- | --- | --- |
| 1 | A | no | 705.0 |
|  | B | no | 837.3 |
|  | C | yes | 1086.0 |

TABLE 2-continued

| Sample | Insert | External Adhesive | Lbs. Force to separate disc |
| --- | --- | --- | --- |
|  | D | yes | 1093.0 |
| 2 | E | no | 880.8 |
|  | F | no | 681.1 |
|  | G | yes | 1327.0 |
|  | H | yes | 1239.0 |
| 3 | I | no | 1752.0 |
|  | J | no | 1816.0 |
|  | K | yes | 1087.0 |
|  | L | yes | 1548.0 |
| 4 | M | no | 210.5 |
|  | N | no | 188.5 |
|  | O | yes | 285.6 |
|  | P | yes | 276.8 |

The results in Table 2 demonstrate that the use of the colorant alone (Sample 3) without peroxide provided the best overall comparative performance (approximately 35% improved bonding strength over use of an external adhesive). However, those compositions including the colorant and the organic peroxide cure accelerator together (Samples 1 and 4), while losing adhesive strength in comparison with the same composition using an external adhesive, performed comparably to each other in terms of the degree of loss of bonding strength (29%) despite the lack of additional filler strength in Sample 4 due to the lack of silica filler. The sample with no colorant at all but incorporating organic peroxide (Sample 2) lost the most bonding strength in comparison with the same composition (39%) providing the poorest adhesion properties. Sample 3 is the preferred sample, with an increase in bonding strength. However, Samples 1 and 4 provide useful compositions, which while having tolerable losses in bonding strength still provide alternative compositions for use when achieving optimal cure parameters or minimizing contamination from external adhesives is of a more paramount concern.

EXAMPLE 3

In this Example, additional compositions were prepared (Comparative Sample 5 and Samples 6-9) to illustrate the effects of varying amounts of the colorant in compositions without organic peroxide that incorporate a BOAP curative and a monoamidine cure accelerator (perfluorooctanamidine). The same Polymer A of Example 1 was used in this Example. The BOAP was also the same material as in Example 1. The monoamidine cure accelerator was obtained from SynQuest Laboratories, Inc., Alachua, Fla. The compositions were postcured in nitrogen for 24 hours at 550° F. Curing took place for 5 minutes at 350° F. The results and compositions are shown in Table 3 below, including weight loss of samples when exposed to typical plasma gases encountered in semiconductor manufacturing.

TABLE 3

|  | Sample | | | | |
| --- | --- | --- | --- | --- | --- |
|  | Comp. 5 | 6 | 7 | 8 | 9 |
| Polymer A | 100 | 100 | 100 | 100 | 100 |
| Silica | 20 | 20 | 20 | 20 | 20 |
| BOAP | 1 | 1 | 1 | 1 | 1 |
| monoamidine | 1 | 1 | 1 | 1 | 1 |
| Clariant PV Fast Violet | — | 0.5 | 1.0 | 2.0 | 4.0 |

TABLE 3-continued

|  | Sample | | | | |
| --- | --- | --- | --- | --- | --- |
|  | Comp. 5 | 6 | 7 | 8 | 9 |
| Physical Properties | | | | | |
| Tensile | 1863 | 2058 | 1894 | 2001 | 1887 |
| % elongation | 150 | 155 | 156 | 158 | 134 |
| 100% modulus | 1008 | 1105 | 921 | 1085 | 1293 |
| 50% modulus | 441 | 511 | 405 | 490 | 555 |
| Durometer M | 81 | 82 | 80 | 82 | 83 |
| Specific gravity | 2.045 | 2.039 | 2.036 | 2.032 | 2.019 |
| $T_2$ | 0.94 | 0.92 | 0.95 | 0.94 | 0.96 |
| $T_{90}$ | 4.02 | 3.98 | 3.99 | 3.92 | 4.00 |
| $M_L$ | 1.06 | 1.01 | 1.04 | 0.96 | 1.15 |
| $M_H$ | 10.03 | 9.80 | 9.82 | 9.71 | 9.60 |
| Compression Set in air - 214 O rings | | | | | |
| 70 h @ 400° F. 25% | 25.71 | 20.59 | 22.86 | 22.85 | 20.00 |
| 70 h @ 482° F. 18% | 40.00 | 36.00 | 36.00 | 32.00 | 32.00 |
| 70 h @ 482° F. 25% | 35.29 | 29.41 | 28.57 | 32.00 | 28.57 |
| 70 h @ 572° F. 18% | 56.00 | 56.00 | 56.00 | 52.00 | 54.00 |
| 70 h @ 572° F. 25% | 54.28** | 45.71** | 50.00 | 60.00** | — |
| 70 h @ 600° F. 18% | 76.00 | 80.00 | 76.00 | 72.00 | 84.00 |
| 70 h @ 600° F. 25% | 65.71** | — | — | 71.43** | 71.43¥ |
| Plasma Resistance | | | | | |
| % Wt. Loss in $O_2$ | 0.431 | 0.476 | 0.486 | 0.276 | 0.431 |
| % Wt. Loss in $NF_3$ | 18.911 | 18.650 | 17.143 | 17.359 | 17.381 |
| % Wt. Loss in $SF_6$ | 10.007 | 9.339 | — | 9.048 | 7.922 |
| % Wt. Loss in $CF_4$ | 6.835 | 6.294 | 5.379 | 4.985 | 5.544 |

¥one sample destroyed
*one sample incurred end split
**one sample delaminated

The data demonstrate that the compositions may be optimized to determine the best amount of colorant effective in conjunction with the curatives and other accelerants to achieve good curing and optimized plasma resistance properties in different types of plasma.

EXAMPLE 4

In this Example, compositions 10-21 were prepared based on 100 parts of the same perfluoropolymer used in Example 1 herein. The compositions included varying forms of carbon black Austin Black and N990 as additives along with varying amounts of Varox active peroxide (DBPH)(which is 50% active) as a cure accelerator. Silica was not added to these formulations. The properties described above in Example 1 were measured and are set forth in Table 4 below.

TABLE 4

|  | Sample | | | | | |
| --- | --- | --- | --- | --- | --- | --- |
|  | 10 | 11 | 12 | 13 | 14 | 15 |
| Polymer A | 100 | 100 | 100 | 100 | 100 | 100 |
| N990 | — | — | — | — | 15 | 25 |
| Carbon Black | 25 | 25 | 25 | 25 | 10 | — |
| BOAP | 1.5 | 3 | 3 | 1.5 | 3 | 1.5 |
| Active Peroxide | 1 | 2 | 1 | 2 | 1 | 2 |
| Physical Properties | | | | | | |
| Tensile (psi) | 1628 | 1837 | 1791 | 1622 | 1889 | 1776 |
| % elongation | 120 | 104 | 101 | 153 | 126 | 224 |
| 100% Modulus | 1448 | 1796 | 1764 | 1176 | 1424 | 673 |
| 50% Modulus | 700 | 792 | 853 | 547 | 522 | 335 |
| Durometer M/A | 83/77 | 85/80 | 85/81 | 81/77 | 81.8/— | 81/75 |
| $T_2$ (30 min @ 350° F.) | 3.59 | 2.42 | 3.00 | 2.28 | 2.75 | 1.60 |
| $T_{90}$ (30 min @ 350° F. | 23.63 | 22.42 | 23.90 | 21.41 | 22.77 | 19.64 |
| $M_H$ | 12.78 | 17.56 | 17.90 | 13.05 | 15.21 | 12.91 |
| $M_L$ | 0.388 | 0.508 | 0.440 | 0.466 | 0.378 | 0.268 |
| Compression Set @ 400 F. | 44.11 | 29.41 | 20.58 | 41.17 | 20.58 | 26.47 |
| Compression Set @ 600 F. | 100 | 88 | 72 | 100 | 86 | 100 |

TABLE 4-continued

| | Sample | | | | | |
|---|---|---|---|---|---|---|
| | 16 | 17 | 18 | 19 | 20 | 21 |
| Polymer A | 100 | 100 | 100 | 100 | 100 | 100 |
| N990 | 25 | 25 | 25 | 25 | 25 | 25 |
| Carbon Black | — | — | — | — | — | — |
| BOAP | 3 | 3 | 1.5 | 3 | 4 | 5 |
| Active Peroxide | 2 | 1 | 1 | 1 | 1 | 1 |
| Physical Properties | | | | | | |
| Tensile (psi) | 2069 | 2178 | 2017 | 2284 | 2242 | 2358 |
| % elongation | 154 | 148 | 199 | 158 | 143 | 136 |
| 100% Modulus | 1129 | 1172 | 759 | 1108 | 1270 | 1462 |
| 50% Modulus | 446 | 417 | 318 | 386 | 436 | 499 |
| Durometer M/A | 83/78 | 83/77 | 74/81 | 82/— | 82/— | 83/— |
| $T_2$ (30 min @ 350° F.) | 1.65 | 2.23 | 2.18 | 2.14 | 2.15 | 2.14 |
| $T_{90}$ (30 min @ 350° F. | 19.75 | 21.26 | 21.28 | 21.27 | 21.13 | 21.12 |
| $M_H$ | 13.20 | 13.66 | 13.97 | 13.67 | 13.66 | 14.12 |
| $M_L$ | 0.305 | 0.294 | 0.304 | 0.288 | 0.305 | 0.328 |
| Compression Set @ 400 F. | 17.64 | 11.76 | 14.7 | 11.76 | 11.76 | 11.76 |
| Compression Set @ 600 F. | 80 | 64 | 64 | 68 | 68 | 72 |

EXAMPLE 5

In this Example further compositions (Samples 22-33) were prepared for evaluation of the cure acceleration affect of peroxide. In these formulations, the same polymer as Example 1 was used along with N990 carbon black. The curative included the BOAP from Example 1, the active peroxide of Example 4 and silica. In addition, each example included 5 parts per 100 parts of the perfluoropolymer of Tecospheres ES. The samples were cured at 350° F. for 10 min. The post-cure gas for a 24 hour post cure at 550° F. was also varied in some of the Samples. The compression set of 214 o-rings and the physical properties as described in Example 1 were measured and are set forth in Table 5 below.

TABLE 5

| | Sample | | | | | | |
|---|---|---|---|---|---|---|---|
| | 22 | 23 | 24 | 25 | 26 | 27 | 28 |
| Active peroxide | 0.5 | 0.5 | 1 | 1 | 1 | 1 | 1.5 |
| BOAP | 1 | 3 | 2 | 2 | 2 | 2 | 1 |
| Post Cure | air | air | air | $N_2$ | air | $N_2$ | air |
| Properties | | | | | | | |
| Tensile (psi) | 2021 | 2554 | 2541 | 2413 | 2468 | 2626 | 1882 |
| % Elongation | 185 | 115 | 134 | 112 | 134 | 117 | 199 |
| 100% Modulus | 918 | 2170 | 1788 | 2150 | 1687 | 2178 | 817 |
| 50% Modulus | 382 | 742 | 645 | 652 | 605 | 680 | 353 |
| Durometer M | 79 | 83 | 82 | 82 | 82 | 81 | 78 |
| Spec. Gravity | 1.981 | 1.987 | 1.985 | 1.985 | 1.990 | 1.990 | 1.992 |
| $t_2$ 30 min @ 350 F. | 5.17 | 4.43 | 3.51 | — | 3.71 | — | 3.02 |
| $t_{90}$ 30 min @ 350 F. | 24.41 | 25.03 | 23.99 | — | 23.94 | — | 18.36 |
| $t_2$ 30 min @ 360 F. | 4.15 | 3.54 | 2.78 | — | 2.80 | — | 2.33 |
| $t_{90}$ @ 360 F. | 22.87 | 23.56 | 21.70 | — | 21.97 | — | 15.22 |
| % Comp. Set 70 h @ 400 F. in air | 31.43 | 8.57 | 14.28 | 17.14 | 14.28 | 17.14 | 28.57 |
| % Comp. Set 70 h @ 500 F. in air | 40.00 | 17.14 | 22.86 | 25.71 | 22.86 | 25.71[¥] | 42.86 |
| % Comp. Set 70 h @ 550 F. in air | 45.71 | —[£] | 31.43 | 34.28 | 31.43 | 34.28[¥] | 48.57 |
| % Comp. Set 70 h @ 600 F. in air | 60.00 | —[¥*] | 57.14[#] | 57.14[] | —[#] | 54.28 | 73.53 |

| | Sample | | | | |
|---|---|---|---|---|---|
| | 29 | Comp. 30 | 31 | 32 | 33 |
| Active peroxide | 1.5 | — | 1.5 | 2 | 2 |
| BOAP | 3 | 1 | 2 | 1 | 2 |
| Post Cure | air | "G" | air | air | air |
| Properties | | | | | |
| Tensile (psi) | 2716 | 2010 | 2362 | 2066 | 2543 |
| % Elongation | 126 | 130 | 135 | 200 | 143 |
| 100% Modulus | 2044 | 1372 | 1583 | 787 | 1477 |

TABLE 5-continued

|  | | | | | |
|---|---|---|---|---|---|
| 50% Modulus | 667 | 442 | 507 | 323 | 496 |
| Durometer M | 83 | 78 | 81 | 77 | 80 |
| Spec. Gravity | 1.989 | 1.964 | 1.985 | 1.991 | 1.990 |
| $t_2$ 30 min @ 350 F. | 2.97 | 10.51 | 2.73 | 2.43 | 2.43 |
| $t_{90}$ 30 min @ 350 F. | 21.06 | 26.79 | 21.08 | 15.31 | 19.11 |
| $t_2$ 30 min @ 360 F. | 2.26 | 8.26 | 2.09 | 1.84 | 1.84 |
| $t_{90}$ @ 360 F. | 18.99 | 24.21 | 19.84 | 13.73 | 17.55 |
| % Comp. Set 70 h @ 400 F. in air | 11.43 | 17.14 | 14.28 | 28.57 | 14.70 |
| % Comp. Set 70 h @ 500 F. in air | 20.00 | 22.86$ | 22.86 | 41.18 | 25.71 |
| % Comp. Set 70 h @ 550 F. in air | 31.43* | —& | 34.28 | 48.57 | 37.14 |
| % Comp. Set 70 h @ 600 F. in air | 60.00 | —£ | 60.00 | 76.47 | 67.65 |

¥1 sample destroyed
£both samples destroyed
both samples split
&both samples major delamination
*1 sample major delamination
**both samples minor delamination
$1 sample ID split It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A fluoroelastomeric composition comprising:
   (a) at least one curable fluoropolymer comprising at least one functional group for crosslinking the fluoropolymer, wherein the at least one curable fluoropolymer is a perfluoropolymer which comprises a polymer of tetrafluoroethylene, a perfluoroalkylvinyl ether and at least one curesite monomer, wherein the at least one functional group for crosslinking the fluoropolymer is located on the at least one curesite monomer;
   (b) a curative capable of crosslinking the at least one fluoropolymer selected from the group consisting of functionalized biphenyl-based compounds, compounds according to formula (I):

(I)

wherein Y is selected from the group consisting of substituted alkyl, alkoxy, aryl, aralkyl or aralkoxy groups of from 1 to about 22 carbon atoms; substituted or unsubstituted halogenated alkyl, alkoxy, aryl, aralkyl or aralkoxy groups of from about 1 to about 22 carbon atoms, and perfluoroalkyl, perfluoroalkoxy, perfluoroaryl, perfluoroaralkyl or perfluoroaralkoxy groups of from 1 to about 22 carbon atoms; and $R^1$ is hydrogen; substituted or unsubstituted lower alkyl or alkoxy groups of from 1 to about 6 carbon atoms; and an amino group; and $R^2$ is $R^1$ or hydroxyl, compounds according to formula (II):

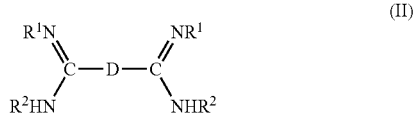

(II)

wherein D is selected from the group consisting of unsubstituted or substituted halogenated alkyl, alkoxy, aryl, aralkyl or aralkoxy groups having from about 1 to about 22 carbon atoms; and perfluoroalkyl, perfluoroalkoxy, perfluoroaryl, perfluoroaralkyl or perfluoroalkoxy groups of from 1 to about 22 carbon atoms; and $R^1$ and $R^2$ are each independently selected to be hydrogen; substituted or unsubstituted lower alkyl or alkoxy groups of from 1 to about 6 carbon atoms and an amino group, and combinations thereof; and
   (c) at least one cure accelerator comprising a peroxide.

2. The composition according to claim 1, wherein the perfluoropolymer comprises two curesite monomers and the at least one functional group is a cyano group, and wherein a cyano group is located on each of the two curesite monomers.

3. The composition according to claim 2, wherein one of the curesite monomers has a primary cyano group and the other curesite monomer has a secondary cyano group.

4. The composition according to claim 1, wherein the curative is the functionalized biphenyl-based compound.

5. The composition according to claim 4, wherein the curative is 2,2-bis[3-amino-4-hydroxyphenyl] hexafluoropropane.

6. The composition according to claim 4, wherein the functionalized biphenyl-based curative is a compound according to formula (III):

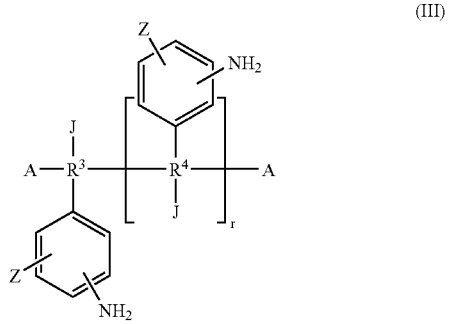

(III)

wherein r is 0 or 1;
$R^3$ and $R^4$ are each independently selected from the group consisting of a carbon atom; substituted and unsubstituted and branched and straight chain carbon groups of from about 2 to about 22 carbon atoms selected from the group consisting of alkyl groups, halogenated alkyl groups, and perfluorinated alkyl groups, each of which groups may be interrupted by at least one oxygen atom; each Z is independently selected from the group consisting of an amino, mercapto, sulfhydryl, or hydroxyl group; each J is independently selected to be formula (IV):

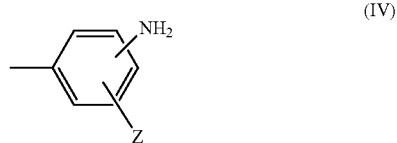

or A; and
each A is independently selected from the group consisting of formula (IV); a fluorine atom; and unsubstituted and substituted and branched and straight chain carbon-based groups which are selected from group consisting of alkyl, halogenated alkyl, and perfluoroalkyl groups of from 1 to about 22 carbon atoms; each of which groups may be interrupted by at least one oxygen atom; wherein when r is 0 and $R^3$ is a carbon atom, at least one of J and each A is not formula (IV).

7. The composition according to claim 1, wherein the curative is a compound according to formula (I) and is selected from the group consisting of perfluorooctanamidine, heptafluorobutyrylamidine, benzamidine, trifluoromethylbenzamidoxime, trifluoromethoxylbenzamidoxime, and mixtures and combinations thereof.

8. The composition according to claim 1, wherein the peroxide is selected from the group consisting of 2,5-dimethyl-2,5-di(t-butylperoxy)hexyne-3, 2,5-dimethyl-2,5-di(t-butylperoxy) hexane, dicumyl peroxide, dibeuzoyl peroxide, t-butyl perbenzoate, α,α'-bis(t-butylperoxy-diisopropylbenzene), di[1, 3-dimethyl-3-(t-butylperoxy)-butyl]carbonate, and combinations thereof.

9. The composition according to claim 1, further comprising a colorant.

10. A fluoroelastomeric composition comprising:
(a) at least one curable fluoropolymer comprising at least one functional group for crosslinking the fluoropolymer, wherein the fluoropolymer is a perfluoropolymer which comprises a polymer of tetrafluoroethylene, a perfluoroalkylvinyl ether and two curesite monomers, the at least one functional group for crosslinking the fluoropolymer is located on each of the curesite monomers, the at least one functional group is a cyano group, and the cyano group is located on each of the two curesite monomers;
(b) a curative capable of crosslinking the at least one fluoropolymer selected from the group consisting of functionalized biphenyl-based compounds, compounds according to formula (I):

wherein Y is selected from the group consisting of substituted alkyl, alkoxy, aryl, aralkyl or aralkoxy groups of from 1 to about 22 carbon atoms; substituted or unsubstituted halogenated alkyl, alkoxy, aryl, aralkyl or aralkoxy groups of from about 1 to about 22 carbon atoms, and perfluoroalkyl, perfluoroalkoxy, perfluoroaryl, perfluoroaralkyl or perfluoroaralkoxy groups of from 1 to about 22 carbon atoms; and $R^1$ is hydrogen; substituted or unsubstituted lower alkyl or alkoxy groups of from 1 to about 6 carbon atoms; and an amino group; and $R^2$ is $R^1$ or hydroxyl, compounds according to Formula (II):

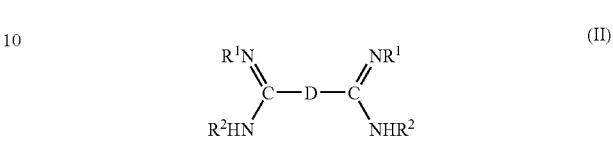

wherein D is selected from the group consisting of unsubstituted or substituted halogenated alkyl, alkoxy, aryl, aralkyl or aralkoxy groups having from about 1 to about 22 carbon atoms; and perfluoroalkyl, perfluoroalkoxy, perfluoroaryl, perfluoroaralkyl or perfluoroalkoxy groups of from 1 to about 22 carbon atoms; and $R^1$ and $R^2$ are each independently selected to be hydrogen; substituted or unsubstituted lower alkyl or alkoxy groups of from 1 to about 6 carbon atoms and an amino group, and combinations thereof; and
(c) at least two cure accelerators, wherein the at least two cure accelerators comprise at least one peroxide.

11. The composition according to claim 10, wherein the at least one peroxide is selected from the group consisting of 2,5-dimethyl-2,5-di(t-butylperoxy)hexyne-3, 2,5-dimethyl-2,5-di (t-butylperoxy)hexane, dicumyl peroxide, dibenzoyl peroxide, t-butyl perbenzoate, α,α'-bis (t-butylperoxy-diisopropylbenzene), di[1,3-dimethyl-3-(t-butylperoxy)-butyl] carbonate and combinations thereof.

12. The composition according to claim 10, wherein the curative is 2,2-bis[3-amino -4-hydroxyphenyl]hexafluoropropane.

13. The composition according to claim 10, wherein the curative is a compound according to formula (I) and is selected from the group consisting of perfluorooctanamidine, heptafluorobutyrylamidine, benzamidine, trifluoromethylbenzamidoxime, trifluoromethoxylbenzamidoxime, and combinations thereof.

14. A perfluoroelastomeric composition comprising:
(a) at least one curable perfluoropolymer comprising at least one functional group for crosslinking the perfluoropolymer;
(b) a functionalized biphenyl-based curative capable of curing the at least one perfluoropolymer; and
(c) at least one cure accelerator comprising a peroxide.

15. The composition according to claim 14, wherein the peroxide is selected from the group consisting of 2,5-dimethyl-2,5-di(t-butylperoxy)hexyne-3, 2,5-dimethyl -2,5 -di(t-butylperoxy) hexane, dicumyl peroxide, dibenzoyl peroxide, t-butyl perbenzoate, α,α'-bis (t-butylperoxy-diisopropylbenzene), di[1, 3-dimethyl-3-(t-butylperoxy)-butyl]carbonate, and combinations thereof.

16. The composition according to claim 14, wherein the perfluoropolymer comprises a polymer of tetrafluoroethylene, a perfluoroalkylvinyl ether and two curesite monomers, the at least one functional group for crosslinking the perfluoropolymer is located on each of the curesite monomers, the at least one functional group is a cyano group, and the cyano group is located on each of the two curesite monomers.

17. The composition according to claim 14, wherein the curative is 2,2-bis[3-amino-4-hydroxyphenyl]hexafluoropropane.

18. A perfluoroelastomeric composition, comprising:
(i) 100 parts by weight of at least one perfluoropolymer comprising at least one functional group for crosslinking the at least one perfluoropolymer;
(ii) about 0.1 to about 10 parts by weight per 100 parts by weight of the at least one perfluoropolymer of a curative capable of crosslinking the at least one perfluoropolymer, the curative being selected from the group consisting of functionalized biphenyl-based compounds, compounds according to formula (I):

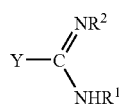 (I)

wherein Y is selected from the group consisting of substituted alkyl, alkoxy, aryl, aralkyl or aralkoxy groups of from 1 to about 22 carbon atoms; substituted or unsubstituted halogenated alkyl, alkoxy, aryl, aralkyl or aralkoxy groups of from about 1 to about 22 carbon atoms, and perfluoroalkyl, perfluoroalkoxy, perfluoroaryl, perfluoroaralkyl or perfluoroaralkoxy groups of from 1 to about 22 carbon atoms; and $R^1$ is hydrogen; substituted or unsubstituted lower alkyl or alkoxy groups of from 1 to about 6 carbon atoms; and an amino group; and $R^2$ is $R^1$ or hydroxyl, compounds according to Formula (II):

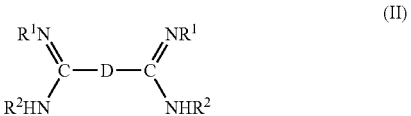 (II)

wherein D is selected from the group consisting of unsubstituted or substituted halogenated alkyl, alkoxy, aryl, aralkyl or aralkoxy groups having from about 1 to about 22 carbon atoms; and perfluoroalkyl, perfluoroalkoxy, perfluoroaryl, perfluoroaralkyl or perfluoroalkoxy groups of from 1 to about 22 carbon atoms; and $R^1$ and $R^2$ are each independently selected to be hydrogen; substituted or unsubstituted lower alkyl or alkoxy groups of from 1 to about 6 carbon atoms and an amino group, and combinations thereof; and
(iii) about 0.1 to about 5 parts by weight per 100 parts by weight of the perfluoropolymer of at least one cure accelerator comprising a peroxide.

19. The perfluoroelastomeric composition according to claim 18, further comprising (iv) about 0.1 to about 20 parts by weight per 100 parts by weight of the perfluoropolymer of a colorant free of metallic elements.

20. The perfluoroelastomeric composition according to claim 19, further comprising silica and comprising from about 0.1 to about 5 parts by weight of the colorant and about 0.5 to about 1 parts by weight of the cure accelerator comprising a peroxide.

* * * * *